(12) United States Patent
Seong et al.

(10) Patent No.: US 10,336,153 B2
(45) Date of Patent: Jul. 2, 2019

(54) ACTIVE ROLL CONTROL APPARATUS

(71) Applicant: MANDO Corporation, Pyeongtaek-si, Gyeonggi-do (KR)

(72) Inventors: Jun Ho Seong, Seongnam-si (KR); Jae Hoon Jang, Seoul (KR); Chang Jun Kim, Gwangmyeong-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 2 days.

(21) Appl. No.: 15/492,150

(22) Filed: Apr. 20, 2017

(65) Prior Publication Data

US 2017/0305227 A1 Oct. 26, 2017

(30) Foreign Application Priority Data

Apr. 20, 2016 (KR) ........................ 10-2016-0048436

(51) Int. Cl.
*B60G 21/055* (2006.01)
*B60G 21/00* (2006.01)
*B60G 17/02* (2006.01)
*B60G 17/016* (2006.01)

(52) U.S. Cl.
CPC ......... *B60G 21/005* (2013.01); *B60G 17/021* (2013.01); *B60G 17/023* (2013.01); *B60G 21/0553* (2013.01); *B60G 21/0558* (2013.01); *B60G 17/016* (2013.01); *B60G 21/0555* (2013.01); *B60G 2202/11* (2013.01); *B60G 2202/135* (2013.01); *B60G 2204/423* (2013.01); *B60G 2206/427* (2013.01)

(58) Field of Classification Search
CPC .............. B60G 21/005; B60G 21/0553; B60G 21/0558; B60G 17/016; B60G 2206/427; B60G 2204/423; B60G 2202/135; B60G 21/0555

See application file for complete search history.

(56) References Cited

U.S. PATENT DOCUMENTS

| | | | | |
|---|---|---|---|---|
| 4,435,100 A * | 3/1984 | Cox | ......................... | F16B 31/00 16/378 |
| 4,691,582 A * | 9/1987 | Weyer | ................ | B60G 21/0553 244/99.7 |
| 4,796,737 A * | 1/1989 | Tyler | ....................... | F16D 11/10 192/18 R |
| 5,628,377 A * | 5/1997 | Le Gloan | ................ | B60B 33/04 16/18 B |
| 6,076,840 A * | 6/2000 | Kincaid | ................ | F16F 1/3842 267/188 |
| 6,286,857 B1 * | 9/2001 | Reese | ...................... | B60G 3/00 280/124.128 |

(Continued)

*Primary Examiner* — Karen Beck
(74) *Attorney, Agent, or Firm* — Hauptman Ham, LLP (57) ABSTRACT

An active roll control apparatus is provided. To adjust a stiffness value of the stabilizer bar by moving a stabilizer bar installed between left and right wheels of a vehicle and extending in a first direction and a stabilizer link connected to the stabilizer bar, the active roll control apparatus includes a sliding part having one side connected to the stabilizer bar and the other side connected to the stabilizer link to slide the stabilizer link in a second direction perpendicular to the first direction, and a movement restricting part installed at the sliding part to restrict movement when the sliding part slides.

13 Claims, 7 Drawing Sheets

(56) References Cited

U.S. PATENT DOCUMENTS

| | | | | |
|---|---|---|---|---|
| 6,481,732 B1* | 11/2002 | Hawkins | ............ | B60G 17/0162 |
| | | | | 280/124.106 |
| 8,408,559 B1* | 4/2013 | Lee | ...................... | B60G 17/016 |
| | | | | 280/5.508 |
| 2008/0067770 A1* | 3/2008 | Germain | ............ | B60G 17/0162 |
| | | | | 280/124.106 |
| 2009/0079177 A1* | 3/2009 | Drinan | ............... | B60G 21/0553 |
| | | | | 280/756 |
| 2010/0090432 A1* | 4/2010 | Hauser | ................. | B60G 17/005 |
| | | | | 280/124.107 |
| 2013/0147141 A1* | 6/2013 | Lee | .................... | B60G 17/0162 |
| | | | | 280/124.106 |
| 2013/0147142 A1* | 6/2013 | Lee | .................... | B60G 17/0162 |
| | | | | 280/124.106 |
| 2016/0200164 A1* | 7/2016 | Tabata | ............... | B60G 21/0553 |
| | | | | 280/5.508 |
| 2018/0244126 A1* | 8/2018 | Kim | .................. | B60G 17/0162 |

* cited by examiner

ACTIVE ROLL CONTROL APPARATUS

CROSS-REFERENCE TO RELATED APPLICATION

This application claims priority to and the benefit of Korean Patent Application No. 10-2016-0048436, filed on Apr. 20, 2016, the disclosure of which is incorporated herein by reference in its entirety.

BACKGROUND

1. Field of the Invention

The present invention relates to an active roll control apparatus.

2. Discussion of Related Art

Generally, a suspension system of a vehicle is a system which prevents damage to a vehicle body and cargo and improves riding comfort by connecting an axle to a vehicle body so that a vibration or an impact received from a road surface by the axle while traveling of the vehicle is controlled to not be directly transmitted to the vehicle body.

The suspension system includes a chassis spring configured to mitigate an impact from a road surface, a shock absorber configured to control free vibration of the chassis spring to be attenuated to improve riding comfort, and a stabilizer bar configured to suppress rolling of a vehicle.

Among these, the stabilizer bar has both sides of a linear part fixed to a vehicle body and both ends fixed to a lower arm or a strut bar through a stabilizer link. Accordingly, the stabilizer bar does not act when left and right wheels simultaneously perform vertical motion and is twisted and performs an anti-roll function which suppresses rolling of a vehicle body by a torsional elastic force when the left and right wheels perform vertical motion relative to each other.

That is, when the left and right wheels have a phase difference relative to each other due to a turning outer side of a vehicle body being tilted due to a centrifugal force during turning of a vehicle or due to bump or rebound during traveling of the vehicle, the stabilizer bar is twisted to stabilize the posture of the vehicle body using a torsional elastic force.

However, the stabilizer bar has a constant stiffness value, and the torsional elastic force of itself is insufficient to ensure turning stability in various conditions. Therefore, nowadays, an active roll control unit in which an actuator formed of a hydraulic cylinder, a motor, or the like is connected to a front end of a stabilizer bar to enable active roll control is being developed and applied.

However, because a conventional active roll control apparatus does not have a separate stopper and may be unintentionally slid by an external force when a vehicle is driven, a mounting position of the conventional active roll control apparatus cannot be fixed, and stability of a vehicle body may be decreased.

SUMMARY OF THE INVENTION

An embodiment of the present invention is directed to providing an active roll control apparatus capable of actively controlling roll stiffness of a vehicle and improving turning stability of the vehicle by adjusting and fixing a connection position of a stabilizer link and changing and fixing a lever ratio of the stabilizer link.

According to an aspect of the present invention, there is provided an active roll control apparatus in which a stabilizer bar installed between left and right wheels of a vehicle and extending in a first direction and a stabilizer link connected to the stabilizer bar are moved to adjust a stiffness value of the stabilizer bar, the active roll control apparatus including a sliding part having one side connected to the stabilizer bar and the other side connected to the stabilizer link to slide the stabilizer link in a second direction perpendicular to the first direction, and a movement restricting part installed at the sliding part to restrict movement when the sliding part slides.

The sliding part may include a joint shaft having one side coupled to one end of the stabilizer bar, and a fastening member having one side coupled to the end of the stabilizer link and having the joint shaft inserted thereinto to slide in the second direction along an outer surface of the joint shaft.

The joint shaft may have a cylindrical shape, a guide groove may be formed at an outer circumferential surface of the joint shaft along an extending direction of the joint shaft, and the fastening member may slide along the guide groove.

The movement restricting part may include a first protrusion protruding outward in a radial direction of the joint shaft from one surface inside the guide groove of the joint shaft, and a locking member formed at an inner surface of the fastening member to correspond to the first protrusion to restrict sliding movement of the fastening member.

The locking member may include a second protrusion protruding from the inner surface of the fastening member and coming into contact with the first protrusion to restrict the first protrusion.

The locking member may have a protrusion groove into which the first protrusion is insertable formed at the inner surface of the fastening member.

The first protrusion may be formed in plurality, and the plurality of first protrusions may be spaced apart along an extending direction of the guide groove.

The plurality of first protrusions may be spaced apart along a circumferential direction of the joint shaft.

The first protrusion and the second protrusion may be formed of an elastic material.

The first protrusion and the second protrusion may be a ball plunger.

The first protrusion may include a first elastic part having a semi-circular cross-section, and a second elastic part having a circular cross-section, one end coming into contact with an inner circumferential surface of the first elastic part, and the other end coming into contact with one surface inside the guide groove to support the first elastic part.

The first protrusion may further include a third elastic part having one end coupled to one surface inside the first elastic part and the other end coupled to one surface inside the guide groove, and a fourth elastic part having one end coupled to the other surface inside the first elastic part and the other end coupled to the other surface inside the guide groove.

The third elastic part and the fourth elastic part may be disposed parallel to each other, and the third elastic part and the fourth elastic part may form an X-shape as a pair.

The second elastic part may be disposed between one side surface of the third elastic part and one side surface of the fourth elastic part facing the surface of the third elastic part.

The first elastic part, the third elastic part, and the fourth elastic part may be a leaf spring, and the second elastic part may be a coil spring.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail with reference to the accompanying drawings in order to enable one of ordinary skill in the art to which the present invention pertains to easily embody the invention. The present invention may be implemented in various different forms and is not limited to embodiments described herein. To clearly describe the present invention, parts unrelated to the description have been omitted from the drawings, and like reference numerals are given to like or similar elements throughout.

In the specification, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

Figure 1:
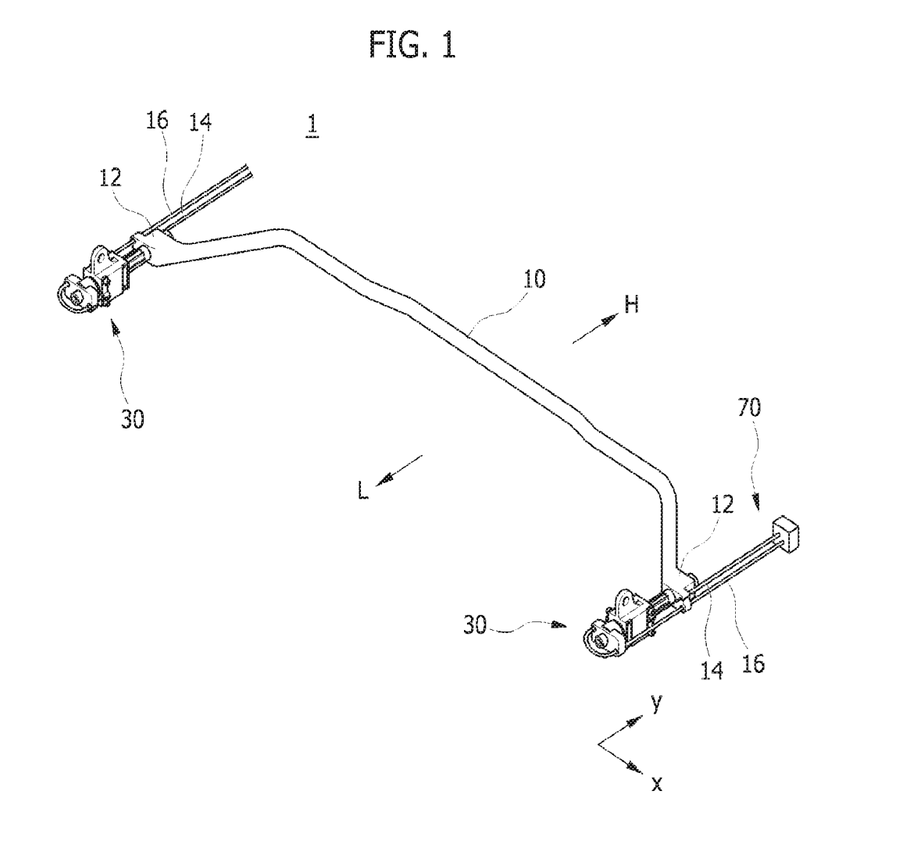
FIG. 1 is a perspective view illustrating an active roll control apparatus according to an embodiment of the present invention.
Figure 2:
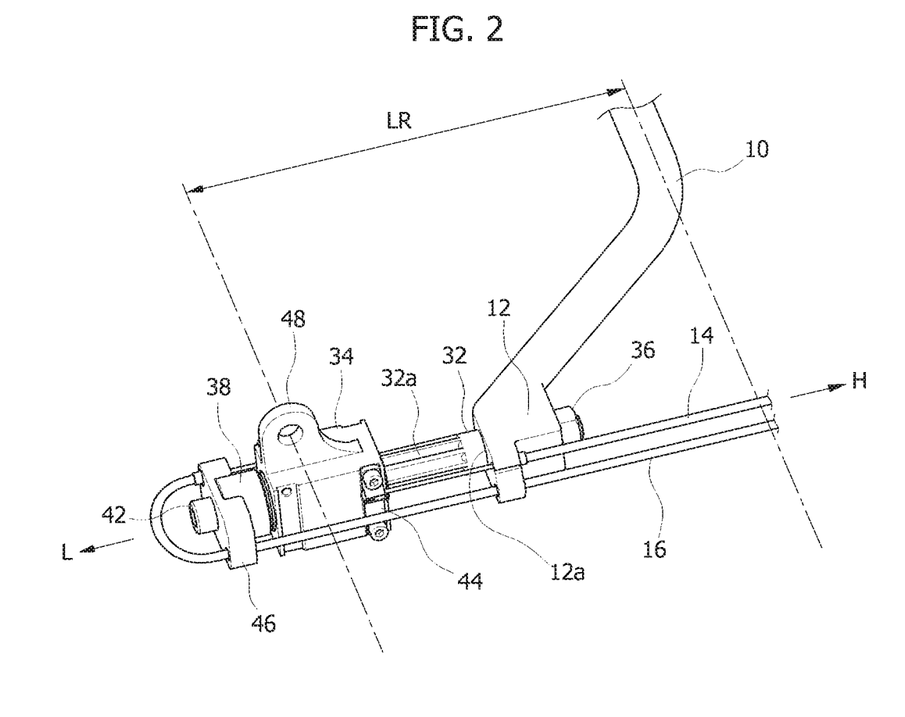
FIG. 2 is a perspective view illustrating a sliding part and a stabilizer bar of the active roll control apparatus according to an embodiment of the present invention.

FIG. 1 is a perspective view illustrating an active roll control apparatus according to an embodiment of the present invention. FIG. 2 is a perspective view illustrating a sliding part and a stabilizer bar of the active roll control apparatus according to an embodiment of the present invention.

In the description below, in FIG. 1, an x-axis direction will be defined as a first direction, and a y-axis direction will be defined as a second direction. In FIG. 2, a direction from a nut toward a bolt will be defined as forward, and a direction from the bolt toward the nut will be defined as rearward.

Referring to FIG. 1, an active roll control apparatus 1 according to an embodiment of the present invention includes a stabilizer bar 10, a driving part 70, and a sliding part 30.

By this, the active roll control apparatus 1 according to an embodiment of the present invention may slide the stabilizer bar 10 connected to a vehicle wheel and change a lever ratio of a stabilizer link (not illustrated) to adjust a stiffness value of the stabilizer bar to achieve stability of a vehicle.

According to an embodiment of the present invention, the stabilizer bar 10 may be installed at a front wheel and a rear wheel of the vehicle. Referring to FIG. 1, the stabilizer bar 10 may extend in the first direction and receive a rotational force from an actuator (not illustrated) when the vehicle is driven to control a roll behavior of the vehicle.

Here, according to an embodiment of the present invention, although not illustrated, the first direction may be a width direction of the vehicle, and the second direction may be a direction perpendicular to the width direction of the vehicle.

According to an embodiment of the present invention, a coupling part 12 may be formed at both ends of the stabilizer bar 10 to be coupled to a joint shaft 32 which will be described below. Referring to FIG. 2, according to an embodiment of the present invention, the coupling part 12 may have a through-hole 12a into which one end of the joint shaft 32 is insertable.

Referring to FIG. 1, according to an embodiment of the present invention, the sliding part 30 may be connected to the both ends of the stabilizer bar 10. In the active roll control apparatus 1 according to an embodiment of the present invention, the stabilizer link is slid in the second direction perpendicular to the first direction by the sliding part 30 according to traveling conditions of the vehicle, and a lever ratio of the stabilizer link is changed. In this way, the active roll control apparatus 1 may adjust a stiffness value of the stabilizer bar and actively improve the roll behavior of the vehicle.

According to an embodiment of the present invention, the driving part 70 is connected to the sliding part 30 via a first cable 14 and a second cable 16 and enables the sliding part to slide. Here, the driving part 70 may be a two-way servo motor capable of controlling a number of rotations and a rotating direction, but is not limited thereto.

Here, the first cable 14 and the second cable 16 may respectively include external cables 14 and 16 and inner cables (not illustrated) disposed inside the external cables.

Referring to FIG. 2, according to an embodiment of the present invention, the sliding part 30 may include the joint shaft 32 and a fastening member 34. According to an embodiment of the present invention, the joint shaft 32 may be coupled to the stabilizer bar via the coupling part 12 formed at the both ends of the stabilizer bar 10.

Referring to FIGS. 1 and 2, according to an embodiment of the present invention, the joint shaft 32 may have a cylindrical shape and formed as a pair to be fixed to the both ends of the stabilizer bar 10.

Referring to FIG. 2, according to an embodiment of the present invention, the joint shaft 32 may be coupled to the both ends of the stabilizer bar via the coupling part 12 formed at the both ends of the stabilizer bar 10.

Also, according to an embodiment of the present invention, the through-hole 12a may be formed at an end of the coupling part 12 so that one end of the joint shaft 32 is insertable thereinto. By the joint shaft 32 being inserted into the through-hole of the coupling part and then being fastened by a nut 36, the joint shaft 32 may be fixed to the both ends of the stabilizer bar 10.

Here, according to an embodiment of the present invention, the coupling part 12 may have a diameter that is larger than that of the stabilizer bar 10 so that the joint shaft 32 has a fastening stiffness of a certain level or higher.

Also, referring to FIG. 2, according to an embodiment of the present invention, the joint shaft 32 may extend in the second direction and disposed in the direction perpendicular to the width direction of the vehicle.

Here, according to an embodiment of the present invention, the joint shaft 32 may stably support the fastening member 34 to which the stabilizer link is coupled while simultaneously guiding the fastening member when the fastening member 34 slides.

Figure 3:
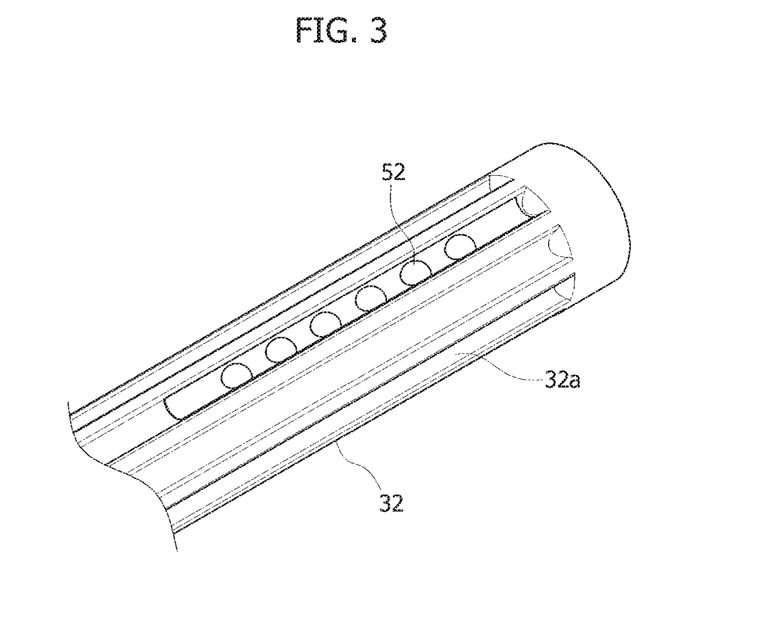
FIG. 3 is a perspective view illustrating a joint shaft of the active roll control apparatus according to an embodiment of the present invention.

FIG. 3 is a perspective view illustrating a joint shaft of the active roll control apparatus according to an embodiment of the present invention.

Referring to FIG. 3, a guide groove 32a may be formed in at least a portion of the outer circumferential surface of the joint shaft 32 along the extending direction of the joint shaft 32. Here, the guide groove 32a may be formed in plurality, and the plurality of guide grooves may be spaced apart from each other along a circumferential direction of the joint shaft 32.

Referring to FIG. 3, according to an embodiment of the present invention, the guide groove 32a may have a semicircular cross-section. Here, the fastening member 34 may smoothly slide along the guide groove 32a. The fastening member 34 may slide along a predetermined path without running idle in the circumferential direction.

Referring to FIG. 3, the active roll control apparatus 1 may include a movement restricting part 50 installed at the sliding part 30 to restrict movement when the sliding part slides. Here, according to an embodiment of the present invention, the movement restricting part 50 may include a first protrusion 52 and a locking member 54.

According to an embodiment of the present invention, the first protrusion 52 may protrude from an inner circumferential surface of the guide groove 32a of the joint shaft 32 in a radial direction of the joint shaft. Here, the first protrusion 52 may be formed in plurality along an extending direction of the guide groove 32a.

Referring to FIG. 2, the fastening member 34 may have the joint shaft 32 inserted thereinto to be slidable along the outer surface of the joint shaft. The fastening member 34 may have a rectangular parallelepiped shape with a quadrilateral cross-section, but the shape is not limited thereto.

According to an embodiment of the present invention, the fastening member 34 may have an insertion-hole 34a formed so that the joint shaft 32 is insertable thereinto. Here, the fastening member 34 may slide along the guide groove 32a of the joint shaft 32 inserted into the insertion-hole 34a.

According to an embodiment of the present invention, the fastening member 34 may have a connecting part 48 formed at one side surface to be connected to one end of the stabilizer link. In the active roll control apparatus 1 according to an embodiment of the present invention, by being connected to the stabilizer link via the connecting part 48, the fastening member 34 may change a lever ratio of the stabilizer link when sliding along the outer circumferential surface of the joint shaft 32.

In this way, the active roll control apparatus 1 according to an embodiment of the present invention changes a stiffness value of the stabilizer bar 10. Also, according to an embodiment of the present invention, although not illustrated, the other end of the stabilizer link may be connected to the stabilizer bar 10 via a ball joint (not illustrated).

Figure 4:
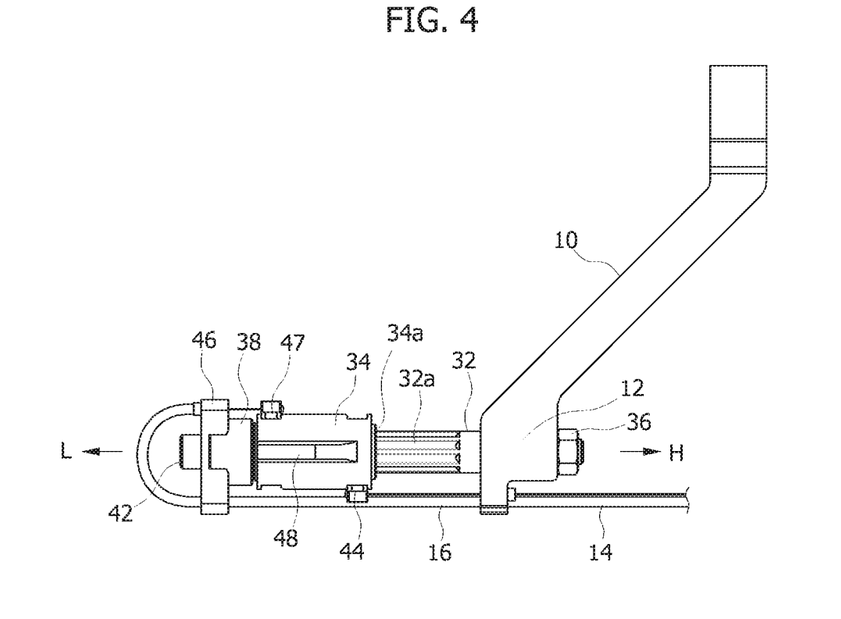
FIG. 4 is a side view illustrating the sliding part and the stabilizer bar of the active roll control apparatus according to an embodiment of the present invention.
Figure 5:
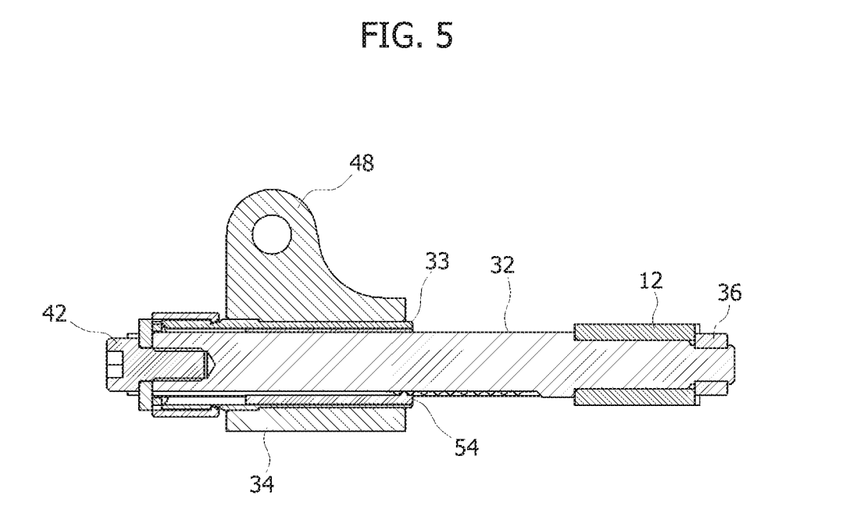
FIG. 5 is a cross-sectional view illustrating the sliding part of the active roll control apparatus according to an embodiment of the present invention.
Figure 6:
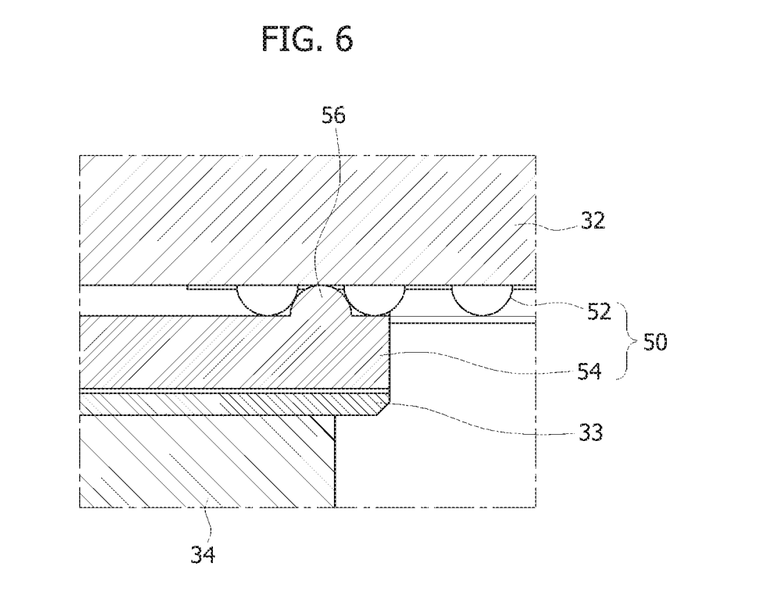
FIG. 6 is a cross-sectional view illustrating a first protrusion and a second protrusion of the active roll control apparatus according to an embodiment of the present invention.
Figure 7:
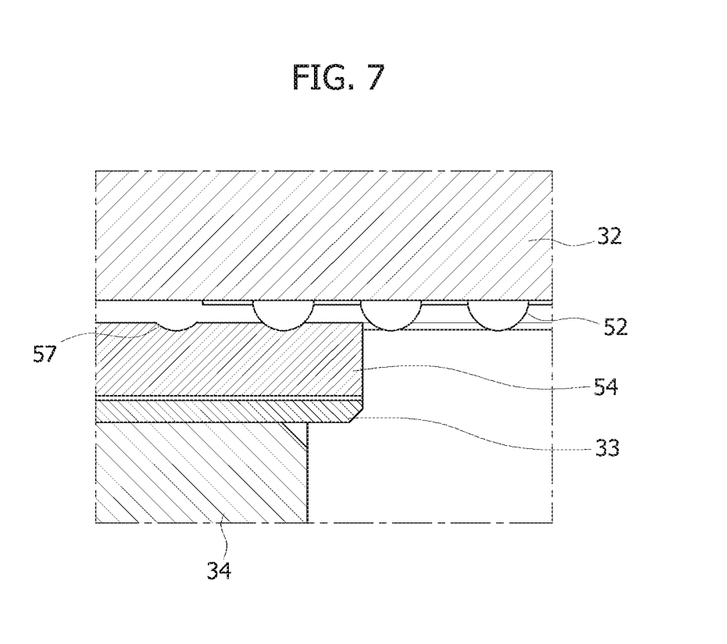
FIG. 7 is a cross-sectional view illustrating the first protrusion and a protrusion groove of the active roll control apparatus according to an embodiment of the present invention.

FIG. 4 is a side view illustrating the sliding part and the stabilizer bar of the active roll control apparatus according to an embodiment of the present invention. FIG. 5 is a cross-sectional view illustrating the sliding part of the active roll control apparatus according to an embodiment of the present invention. FIG. 6 is a cross-sectional view illustrating a first protrusion and a second protrusion of the active roll control apparatus according to an embodiment of the present invention. FIG. 7 is a cross-sectional view illustrating the first protrusion and a protrusion groove of the active roll control apparatus according to an embodiment of the present invention.

Referring to FIG. 4, according to an embodiment of the present invention, the locking member 54 may be coupled to an inner portion of the fastening member 34. Here, according to an embodiment of the present invention, when the fastening member 34 slides in contact with the joint shaft 32, the locking member 54 may restrict sliding movement of the fastening member.

Referring to FIGS. 4 and 6, the locking member 54 may have a cylindrical shape, and a second protrusion 56 coming into contact with the first protrusion 52 of the joint shaft 32 to restrict the first protrusion may protrude inward in the radial direction from an inner circumferential surface of the locking member. Here, the first protrusion 52 and the second protrusion 56 may be a ball plunger.

Referring to FIG. 7, according to an embodiment of the present invention, as a modified example, the locking member 54 may have a protrusion groove 57 recessed outward in the radial direction from an inner circumferential surface thereof so that the first protrusion 52 is inserted into the protrusion groove 57 and restricted thereby.

Referring to FIG. 5, according to an embodiment of the present invention, a moving member 33 may be installed between an inner surface of the fastening member 34 and an outer surface of the locking member 54. Here, according to an embodiment of the present invention, the moving member 33 may have a tubular shape, but the shape is not limited thereto.

According to an embodiment of the present invention, the moving member 33 may have a front portion, which is one end, installed to be exposed to the outside of the fastening member 34 and a rear portion, which is the other end, press-fitted into the fastening member 34 and fixed by welding. Here, the locking member 54 may be coupled to an inner portion of the moving member 33.

Referring to FIGS. 4 and 5, according to an embodiment of the present invention, a cover member 38 may be coupled to a front end of the joint shaft 32 exposed to the outside of the fastening member 34 to cover an exposed outer surface of the joint shaft 32.

Here, according to an embodiment of the present invention, the cover member 38 may prevent a foreign material from being introduced from outside through the end of the joint shaft 32 exposed to the outside of the fastening member 34.

According to an embodiment of the present invention, the cover member 38, the moving member 33, the locking member 54, and the fastening member 34 may be integrally formed, and may be interlocked together when the fastening member slides and slide along the outer surface of the joint shaft 32.

Referring to FIG. 5, a first cable holder 44 connected to the first cable 14 may be fixed to one side of the fastening member 43, e.g., a side surface of a rear end of the fastening member as illustrated in FIG. 5.

Here, according to an embodiment of the present invention, the first cable 14 connected to the driving part 70 may have the outer cable fixed to the coupling part 12 of the stabilizer bar 10 and the inner cable passing through the coupling part 12 to be supported by the first cable holder 44.

Referring to FIGS. 2 and 5, a second cable holder 46 having the second cable 16 passed therethrough and supported thereby may be installed at one side of the cover member 38, e.g., a front end of the cover member 38 as illustrated in FIG. 5. Here, the second cable holder 46 may be coupled to the front end of the joint shaft 32 by a bolt 42 and remain fixed together with the joint shaft 32.

Referring to FIG. 4, a third cable holder 47 connected to the second cable 16 may be fixed at one side of the fastening member 34, e.g., a side surface of a front end of the fastening member as illustrated in FIG. 4.

Here, according to an embodiment of the present invention, the second cable 16 may have the external cable passing through the coupling part 12 of the stabilizer bar 10 and one side of the second cable holder 46 to enter the other side of the second cable holder 46 and be fixed, and the inner cable (core wire) supported by the third cable holder 47 of the fastening member 34.

Figure 8:
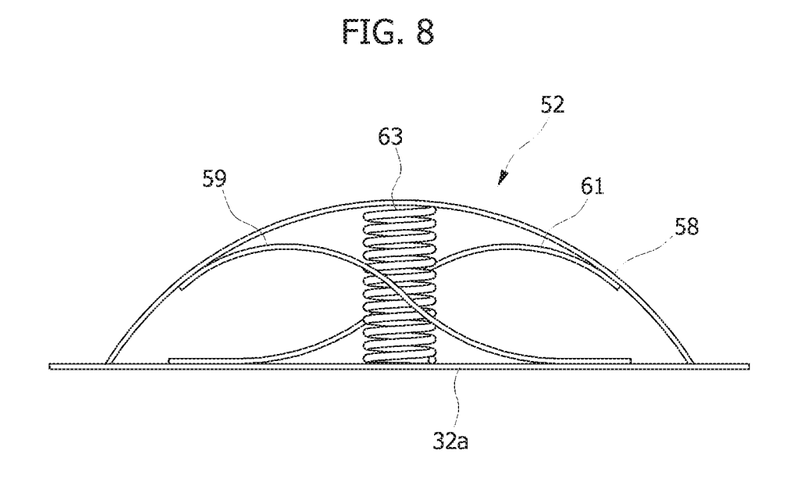
FIG. 8 is a cross-sectional view illustrating the first protrusion of the active roll control apparatus according to an embodiment of the present invention.
Figure 9:
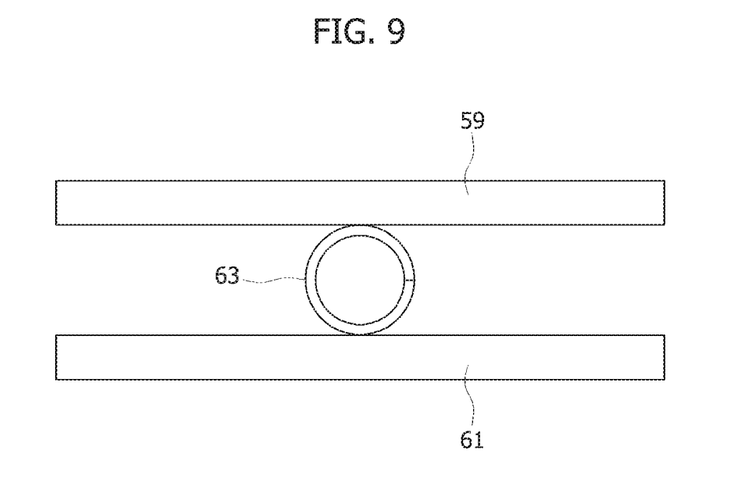
FIG. 9 is a plan view illustrating the first protrusion of the active roll control apparatus according to an embodiment of the present invention.

FIG. 8 is a cross-sectional view illustrating the first protrusion of the active roll control apparatus according to an embodiment of the present invention. FIG. 9 is a plan view illustrating the first protrusion of the active roll control apparatus according to an embodiment of the present invention.

Referring to FIGS. 3, 6, and 8, according to an embodiment of the present invention, the first protrusion 25 may have a semi-circular shape and be formed of an elastic material. Here, the first protrusion 52 may include a first elastic part 58, a second elastic part 59, a third elastic part 61, and a fourth elastic part 63.

Here, according to an embodiment of the present invention, the first elastic part 58 may have a semi-circular shape, be formed at the outer circumferential surface of the first protrusion 52, and come into contact with the second protrusion 56.

Referring to FIGS. 8 and 9, the second elastic part 59 may have one end coupled to one surface inside the first elastic part 58 having the semi-circular shape and the other end coupled to one surface inside the guide groove 32a. Also, the third elastic part 61 may have one end coupled to the other surface inside the first elastic part 58 having the semi-circular shape and the other end coupled to the other surface inside the guide groove 32a.

That is, according to an embodiment of the present invention, as illustrated in FIG. 8, the second elastic part 59 and the third elastic part 61 may form an X-shape as a pair. As illustrated in FIG. 9, the second elastic part 59 and the third elastic part 61 may be disposed parallel to each other. In this way, the first elastic part 58 may be restored to its original state after being elastically pressed.

Referring to FIGS. 8 and 9, the fourth elastic part 63 may have a circular cross-section, one end coming into contact with an inner surface of the first elastic part 58, and the other end coming into contact with an inner surface of the guide groove 32a. Also, the fourth elastic part 63 may be disposed between the second elastic part 59 and the third elastic part 61. In this way, the first elastic part 58 may be restored to its original state after being elastically pressed.

That is, the fourth elastic part 63 may be disposed between one side surface of the second elastic part 59 and one side surface of the third elastic part 61 facing the surface of the second elastic part and support the first elastic part 58. In this way, the first elastic part may be restored to its original state after being elastically pressed.

Here, according to an embodiment of the present invention, the first elastic part 58, the second elastic part 59, and the third elastic part 61 may be a leaf spring formed in the shape of a plate, and the fourth elastic part 63 may be a coil spring formed in a circular shape.

Referring to FIG. 6, the second protrusion 56 protruding outward may be formed at an inner surface of the locking member 54. According to an embodiment of the present invention, the second protrusion 56 may be formed in a semi-circular shape to correspond to the first protrusion 52.

Also, according to an embodiment of the present invention, the second protrusion 56 of the locking member 54 may come into contact with the first protrusion 52 and be fixed in contact with portions in between a plurality of first protrusions and side surfaces of the first protrusions to fix the fastening member 34.

Figure 10A:
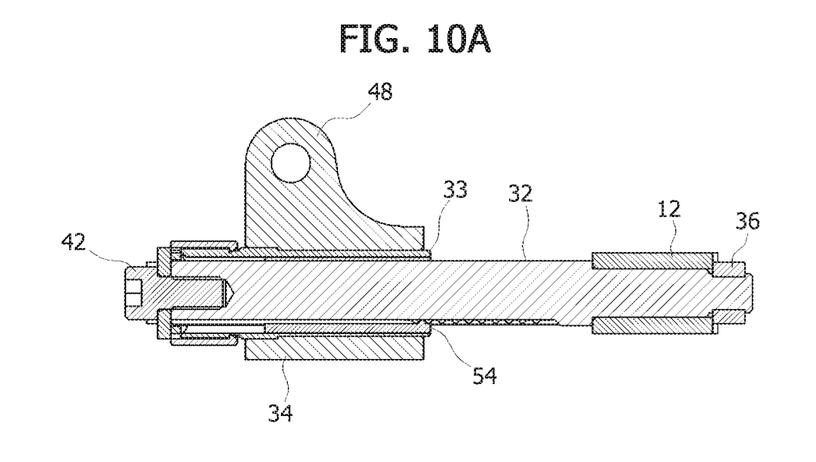
FIGS. 10(a) and 10(b) are schematic views illustrating operational states of the active roll control apparatus according to an embodiment of the present invention.
Figure 10B:
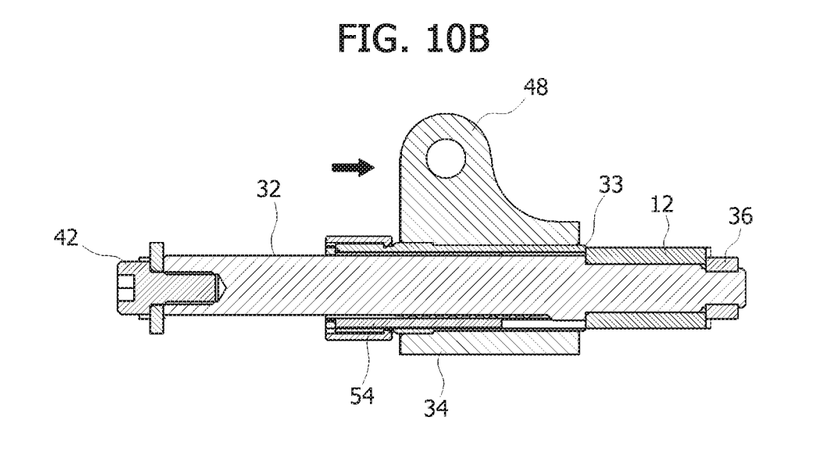

FIGS. 10(a) and 10(b) are schematic views illustrating operational states of the active roll control apparatus according to an embodiment of the present invention.

Referring to FIGS. 2 and 10, in the active roll control apparatus 1 according to an embodiment of the present invention, when the inner cable (not illustrated) of the first cable 14 is pulled, the fastening member 34 is moved in a direction H with respect to the second cable holder 46 which remains fixed together with the joint shaft 32, and a length LR of the stabilizer link is reduced. In this way, the stiffness value of the stabilizer bar 10 may be increased.

Conversely, when the inner cable of the second cable 16 is pulled, the fastening member 34 is moved in a direction L, and the length LR of the stabilizer bar is increased. In this way, the stiffness value of the stabilizer bar 10 may be decreased.

Here, when any one of the first cable 14 and the second cable 16 is pulled toward one side, the other cable is released toward the opposite direction so that the fastening member 34 may smoothly move. After the fastening member 34 is moved in the direction H or L, the second protrusion 56 of the fastening member comes into contact with the first protrusion 52 and is fixed. In this way, the length of the stabilizer link can be prevented from being unintentionally changed while driving.

According to an embodiment of the present invention, an active roll control apparatus includes a first protrusion and a movement restricting part, thereby fixing a sliding part to prevent a length of the sliding part from being unintentionally changed due to an external force while driving.

According to an embodiment of the present invention, an active roll control apparatus includes an elastic part, thereby preventing wear of a first protrusion and a second protrusion when a length of a sliding part is changed, and achieving stability of a vehicle by enabling smooth movement of the vehicle.

Embodiments of the present invention have been described above. However, the spirit of the present invention is not limited the embodiments proposed herein. One of ordinary skill in the art who understands the spirit of the present invention may easily propose other embodiments within the same scope by adding, changing, and omitting elements, but the embodiments should also be understood as belonging to the scope of the present invention.

What is claimed is:

1. An active roll control apparatus in which a stabilizer bar installed between left and right wheels of a vehicle and extending in a first direction and a stabilizer link connected to the stabilizer bar are moved to adjust a stiffness value of the stabilizer bar, the active roll control apparatus comprising:
- a sliding part having one side connected to the stabilizer bar and the other side connected to the stabilizer link to slide the stabilizer link in a second direction perpendicular to the first direction; and
- a movement restricting part installed at the sliding part to restrict movement when the sliding part slides, wherein the sliding part includes:
- a joint shaft having one side coupled to one end of the stabilizer bar; and
- a fastening member having one side coupled to the end of the stabilizer link and having the joint shaft inserted thereinto to slide in the second direction along an outer surface of the joint shaft, wherein the movement restricting part includes:
- a first protrusion protruding outward in a radial direction of the joint shaft from one surface inside the guide groove of the joint shaft; and
- a locking member formed at an inner surface of the fastening member to correspond to the first protrusion to restrict sliding movement of the fastening member.

2. The active roll control apparatus of claim 1, wherein the locking member includes a second protrusion protruding from the inner surface of the fastening member and coming into contact with the first protrusion to restrict the first protrusion.

3. The active roll control apparatus of claim 1, wherein the locking member has a protrusion groove into which the first protrusion is insertable formed at the inner surface of the fastening member.

4. The active roll control apparatus of claim 1, wherein the first protrusion is formed in plurality, and the plurality of first protrusions are spaced apart along an extending direction of the guide groove.

5. The active roll control apparatus of claim 1, wherein the plurality of first protrusions are spaced apart along a circumferential direction of the joint shaft.

6. The active roll control apparatus of claim 2, wherein the first protrusion and the second protrusion are formed of an elastic material.

7. The active roll control apparatus of claim 2, wherein the first protrusion and the second protrusion are a ball plunger.

8. The active roll control apparatus of claim 1, wherein the first protrusion includes:
- a first elastic part having a semi-circular cross-section; and
- a second elastic part having a circular cross-section, one end coming into contact with an inner circumferential surface of the first elastic part, and the other end coming into contact with one surface inside the guide groove to support the first elastic part.

9. The active roll control apparatus of claim 8, wherein the first protrusion further includes:
- a third elastic part having one end coupled to one surface inside the first elastic part and the other end coupled to one surface inside the guide groove; and
- a fourth elastic part having one end coupled to the other surface inside the first elastic part and the other end coupled to the other surface inside the guide groove.

10. The active roll control apparatus of claim 9, wherein the third elastic part and the fourth elastic part are disposed parallel to each other, and the third elastic part and the fourth elastic part form an X-shape as a pair.

11. The active roll control apparatus of claim 9, wherein the second elastic part is disposed between one side surface of the third elastic part and one side surface of the fourth elastic part facing the surface of the third elastic part.

12. The active roll control apparatus of claim 9, wherein the first elastic part, the third elastic part, and the fourth elastic part are a leaf spring, and the second elastic part is a coil spring.

13. The active roll control apparatus of claim 1, wherein the joint shaft has a cylindrical shape, a guide groove is formed at an outer circumferential surface of the joint shaft along an extending direction of the joint shaft, and the fastening member slides along the guide groove.

* * * * *